United States Patent
Chang et al.

(10) Patent No.: US 6,987,341 B2
(45) Date of Patent: Jan. 17, 2006

(54) MOTOR OF ROTOR WITH BUILT-IN PERMANENT MAGNET

(75) Inventors: Yu-Choung Chang, Hsinchu (TW); Ching-Feng Lai, Taichung (TW); Ching-Huan Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/910,278

(22) Filed: Aug. 4, 2004

(65) Prior Publication Data
US 2005/0001504 A1    Jan. 6, 2005

Related U.S. Application Data

(63) Continuation-in-part of application No. 10/036,504, filed on Jan. 7, 2002, now abandoned.

(51) Int. Cl.
*H02K 21/12* (2006.01)

(52) U.S. Cl. ............................ 310/156.45; 310/156.53; 310/156.56

(58) Field of Classification Search ................ 310/156.53–156.57, 156.38, 156.39, 156.45, 310/156.49
See application file for complete search history.

(56) References Cited

U.S. PATENT DOCUMENTS

| | | | |
|---|---|---|---|
| 5,581,140 A * | 12/1996 | Futami et al. | 310/156.53 |
| 5,811,904 A | 9/1998 | Tajima et al. | 310/156 |
| 6,441,524 B2 | 8/2002 | Kaneko et al. | 310/156.45 |
| 6,891,298 B2 * | 5/2005 | Gary | 310/156.53 |

FOREIGN PATENT DOCUMENTS

| JP | 05176487 A | 7/1993 |
|---|---|---|
| JP | 05191936 A | 7/1993 |

* cited by examiner

*Primary Examiner*—Tran Nguyen
(74) *Attorney, Agent, or Firm*—Troxell Law Office, PLLC (57) ABSTRACT

The present invention is a motor of rotor with built-in permanent magnet, which includes an annular stator and a rotor. The annular stator has a cylindrical interior into which the rotor is inserted. A space is formed between a circumference surface of cylindrical interior and rotor. The rotor further includes a rotor core, and a plurality of openings are formed surrounding the rotor core. Each opening is with two parallel surfaces, a top surface and a bottom surface, and each of them is a flat plate figure. A suitable distance is between two side surfaces and an outer circumference of the rotor, and the two side surfaces of adjacent openings are spaced by a channel fo suitable width. A plurality of permanent magnets are arranged in openings by way of interlaced magnetic poles, and the shape of permanent matches the shape of the opening.

13 Claims, 12 Drawing Sheets

MOTOR OF ROTOR WITH BUILT-IN PERMANENT MAGNET

RELATED APPLICATIONS

This application is a continuation-in-part of U.S. Ser. No. 10/036,504, filed on Jan. 7, 2002, entitled "A Motor of Rotor With Built-In Permanent Magnet" and now abandoned.

BACKGROUND OF THE INVENTION

1. Field of the Invention

The present invention is a motor of rotor with built-in permanent magnet, especially refer to a rotor which has no flux-barrier holes, and can effectively prevent phenomena of short-circuiting of magnetic flux.

2. Background of the Invention

As science is advanced day by day, the needs of normal life tend to short, light, thin and small products; the improvement of general mechanical mechanism is toward to high efficiency. The design of traditional motor torque of surface mount motor ($T = Pn \times \phi a \times Ia$, where Pn is pole number, $\phi a$ is magnetic flux on d-axis, Ia is electric current on d-axis) is not suitable to electrical vehicles and compressors of refrigeration and air condition fields. Thus, adding an permanent magnet on rotor to promote total torque of traditional motor device, thus the total torque ($T = Pn[\phi a \times Ia + 0.5(Ld-Lq) \times Id \times Iq]$, where $\phi a \times Ia$ is magnetic torque producing from permanent magnet of rotor, $0.5(Ld-Lq) \times Id \times Iq$ is reluctance torque producing form inductance difference of axes d and q) is with both magnetic torque and reluctance torque. Thus, under same volume condition, the motor of rotor with built-in permanent magnet which output torque and running efficiency are better than the traditional surface mount motor with magnetic torque. In another words, under same output torque condition, the volume of motor of rotor with built-in permanent magnet is smaller than the volume of the traditional motor with magnetic torque.

Figure 1A:
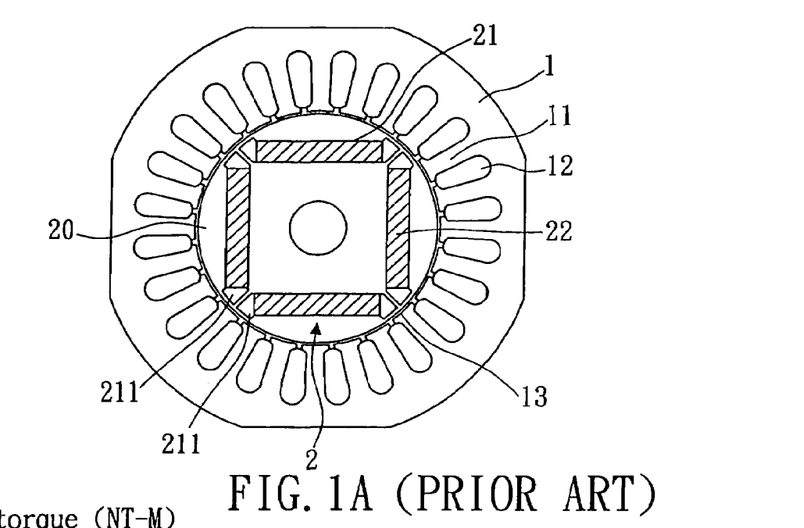
FIG. 1A is sectional structure view of motor of rectangular piece permanent magnet in prior art.

Please refer to FIG. 1A, which is sectional structure view of a 4-pole motor of rectangular piece permanent magnet in prior art. Wherein, the motor of rotor with rectangular piece permanent magnet comprises of: a annular stator 1 and a rotor 2. A cylindrical capacity with suitable diameter is set in the annular stator 1, and its circumference surface is with teeth 11 and openings 12. Each tooth 11 and each slot 12 are interlaced each other. There are some wires winding around slot 12. The rotor 2 is a cylindrical structure set in the cylindrical capacity, and there is an air gap 13 between rotor 2 and the circumference surface of cylindrical capacity. Rotor 2 further includes a cylindrical rotor core 20, and four rectangular openings 21 which are set surrounding the rotor core 20. Four relative rectangular solid permanent magnets 22 just insert and match into four rectangular openings 21. The arrangement for four rectangular solid permanent magnets 22 and four rectangular openings 21 is interlaced. When annular stator 2 is electrified, slot 12 produces magnetic forces in order for rotating annular stator 2. Four rectangular piece permanent magnets 22 are easily made and thus manufacturing cost is lower, but the arrangement causes serious magnetic flux leakage and cogging phenomena. Flux leakage lowers down effective torque and motor efficiency. Cogging phenomena increases motor cogging torque, and vibration and noise are both increased as well. Therefore, several flux-barrier holes 211 are drilled on two ends of each rectangular piece 21 in prior art, but the cost is higher, and solving the aforesaid shortcomings is not much (showing as FIGS. 1B and 1C). Besides, because of the flux-barrier holes 211, permanent magnet 22 is hardly fixed when permanent magnet 22 inserting into rectangular openings 21, and thus viscose is a need. Obviously, motor assembly becomes very complicated.

Figure 2:
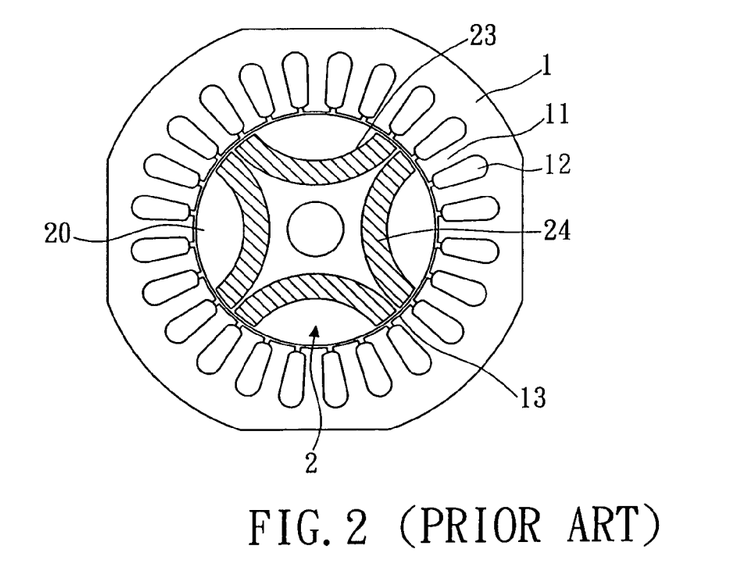
FIG. 2 is sectional structure view of motor of arc piece permanent magnet in prior art.

Please refer to FIG. 2, which is sectional structure view of motor of arc piece permanent magnet in prior art. Wherein, four arc piece pieces 23 are set surrounding rotor core 20, and four relative arc piece permanent magnets 24 are inserted and matched into the four arc piece pieces 23. The arrangement for four arc piece permanent magnets 24 and four arc piece pieces 23 is interlaced. Generally, for producing greater reluctance torque, the arrangement in rotor core 20 is that top arc of arc piece 23 is toward to rotor center of motor. Two ends of each arc piece 23 are toward to contour of rotor core 20. The figures of the two ends of each arc piece 23 are based on arc curvature of rotor core 20. Although the design highly decreases magnetic flux leakage and promotes output torque, the arc curvature of arc piece permanent magnet 24 is complicate, and it is not easily formed in manufacturing. The cost of arc piece permanent magnet 24 for easily inserting and matching into arc piece 23 with no loose is much higher than the cost of rectangular piece permanent magnet, further, cogging torque is also bigger to simply produce vibration.

As a conclusion of aforesaid prior arts, the shortcomings for them cannot be solved one by one, thus the present invention will be described as below to figure out the defects in prior art.

BRIEF DESCRIPTION OF THE INVENTION

The first object of the present invention is to offer a motor of rotor with built-in permanent magnet, and the motor is with low cogging torque to be sure of that the functions of promoting running efficiency and lowering vibration noise are working properly.

The second object of the present invention is to offer a motor of rotor with built-in permanent magnet, the motor is easily and flexibly designed and formed, thus the cost is certainly down.

To reach the aforesaid objects, the present invention comprises of: a rotor core and a plurality of permanent magnets.

The above said rotor core is a cylindrical structure, which is surrounded by a plurality of openings. Each opening is with two parallel surfaces, a top surface and a bottom surface, and each of them is a flat plate figure. The top surface is adjacent to contour of rotor core and extends along the circumference contour forming a side surface. There is a suitable distance between the side surface and the contour of rotor core. Two adjacent side surfaces are with a certain width of a channel.

The shape of the above permanent magnet is able to meet with the opening, and both of them can be matched each other.

Another preferred embodiment of the present invention is a rotor with built-in permanent magnet, the motor comprises of an annular stator and a rotor.

The above said annular stator is set a cylindrical capacity with a suitable diameter, and the circumference surface of the cylindrical capacity is set a plurality of teeth and a plurality of openings.

The rotor is a cylindrical structure, and it is set in the cylindrical capacity. There is an air gap between rotor and circumference surface of cylindrical capacity. Rotor further includes a rotor core, which is a cylindrical structure, and there are a plurality of openings installed around rotor. Each opening is with two parallel surfaces, a top surface and a bottom surface. The top surface is adjacent to contour of rotor core and extends along the circumference contour forming a side surface. There is a suitable distance between the side surface and the contour of rotor core. Two adjacent side surfaces are with a certain width of a channel and a plurality of permanent magnets. The shape of the above permanent magnet is able to meet with the opening, and both of them can be matched each other.

Other features and advantages of the invention will be apparent from the following description of the preferred embodiments thereof, and from the claims.

DETAILED DESCRIPTION OF THE PREFERRED EMBODIMENT

The main features of motor of rotor with built-in permanent magnet are: a plurality of nearly rectangular-shaped openings are formed surrounding a outer-skirt of a rotor core; each opening is formed with the same shape as the rectangular permanent magnet; each opening is with two parallel surfaces, namely a top surface and a bottom surface, and each of them is a flat plate figure; the top surface is adjacent to a outer contour of rotor core and extends along the contour so as to form a side surface substantially parallel to and nearby the outer contour of the rotor core; two adjacent side surfaces are spaced-apart with a certain width of a channel. Based on the design, manufacturing cost and motor cogging torque can be lowered down; on the other hand, output torque is increased.

Figure 3A:
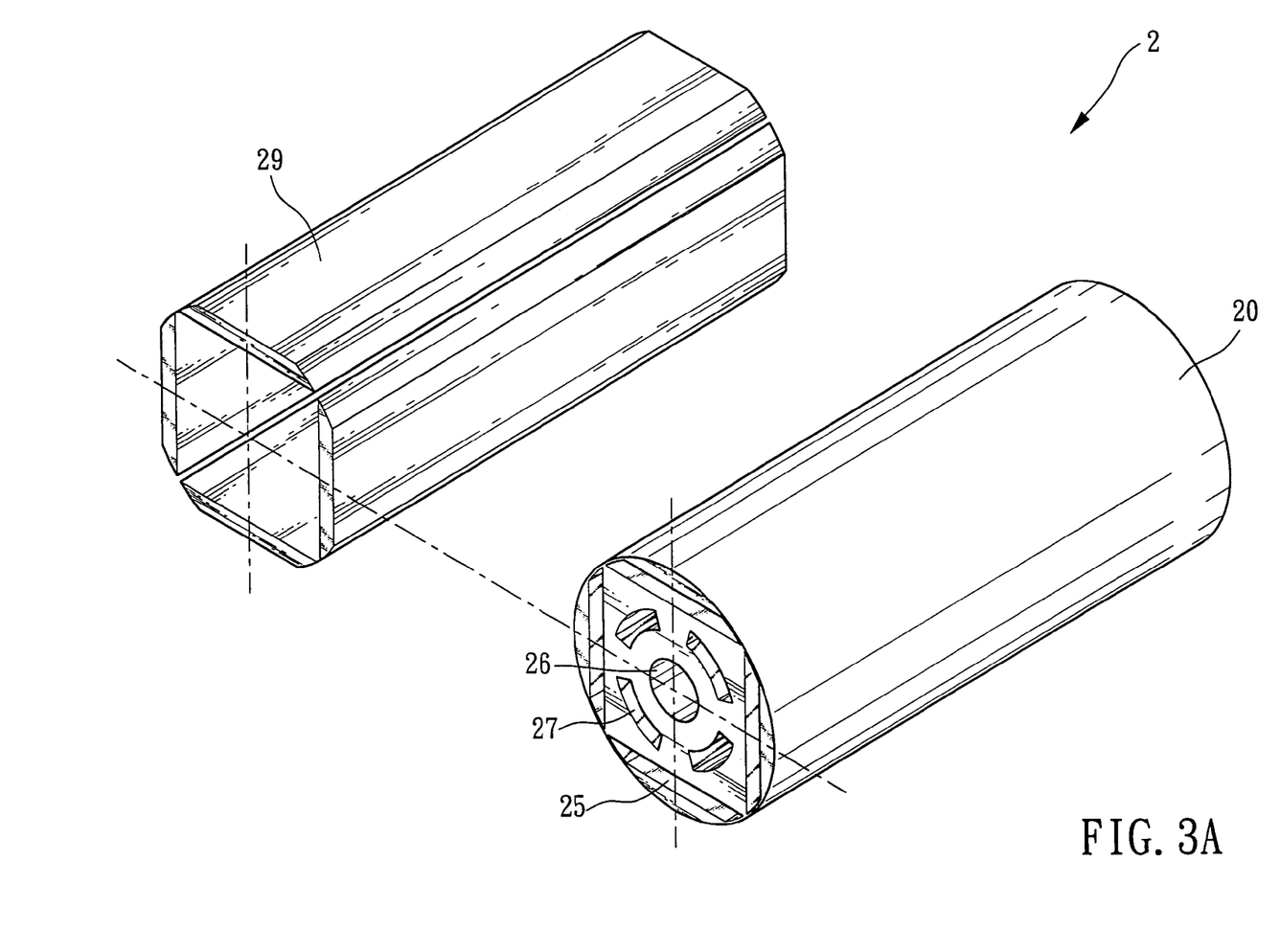
FIG. 3A is 3-D structure view of the first preferred embodiment of rotor with built-in permanent magnet for the present invention.
Figure 3B:
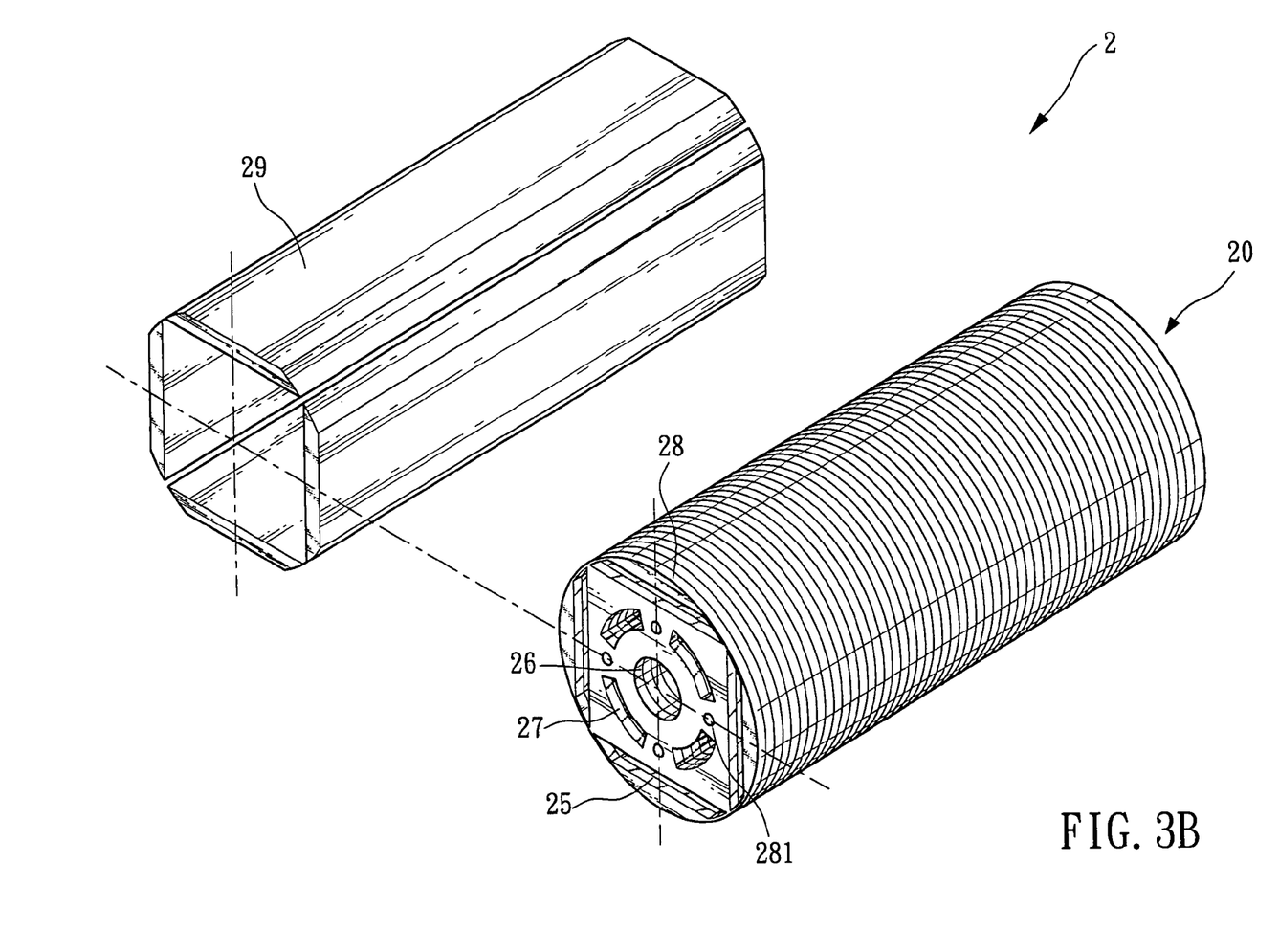
FIG. 3B is 3-D structure view of the second preferred embodiment of rotor with built-in permanent magnet for the present invention.

Please refer to FIGS. 3A and 3B, which are 3-D structure views of the two preferred embodiments of rotor with built-in permanent magnet of the present invention. Wherein, the rotor 2 with built-in permanent magnet comprises of: a rotor core 20 and a plurality of permanent magnets 29. The rotor core 20 is a cylindrical structure. As showing in FIG. 3A, the cylindrical structure could be as an integrally formed solid silicon steel, of course it could be made by other good permeability materials. As showing in FIG. 3B, the preferred cylindrical structure could be formed via accumulation of a plurality of silicon steel sheet pieces 28. The silicon steel sheet piece 28 is made of silicon steel via stamping. Each silicon steel sheet piece 28 has a plurality dents 281, each dent has a convex point on a first surface of the silicon steel sheet piece 28, and a concave point on a second surface. The accumulation of a plurality of silicon steel sheet pieces 28 forms the rotor core 20. The steel sheet pieces 28 can be made by a stamping process to make and match the plurality of dents 281 so as to fix and form the cylindrical structure. A center of rotor core 20 is further designed a central axial hole 26, and a plurality of arc troughs 27 are distributed surrounding the central axial hole 26. Arc troughs 27 can decrease weight and material cost.

A plurality of openings 25 are set surrounding an outer-skirt of the rotor core 20, and the openings 25 can be inserted and matched with permanent magnets 29. The shape of permanent magnet 29 fits with the opening 25, and permanent magnet 29 takes the way of interlaced magnetic poles to be contained in opening 25. In the preferred embodiments of the present invention, the numbers of permanent magnets 29 and openings 25 are four for each of them; on the other hand, the containing arrangement of interlaced magnetic poles makes the numbers be more than two, for instance, four, six, eight, etc.

Figure 4A:
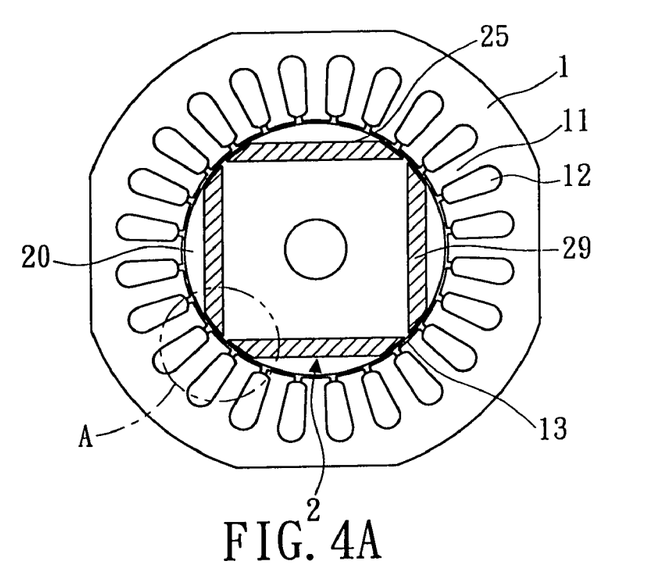
FIG. 4A is sectional structure view of the first preferred embodiment of motor of rotor with built-in permanent magnet for the present invention.
Figure 4B:
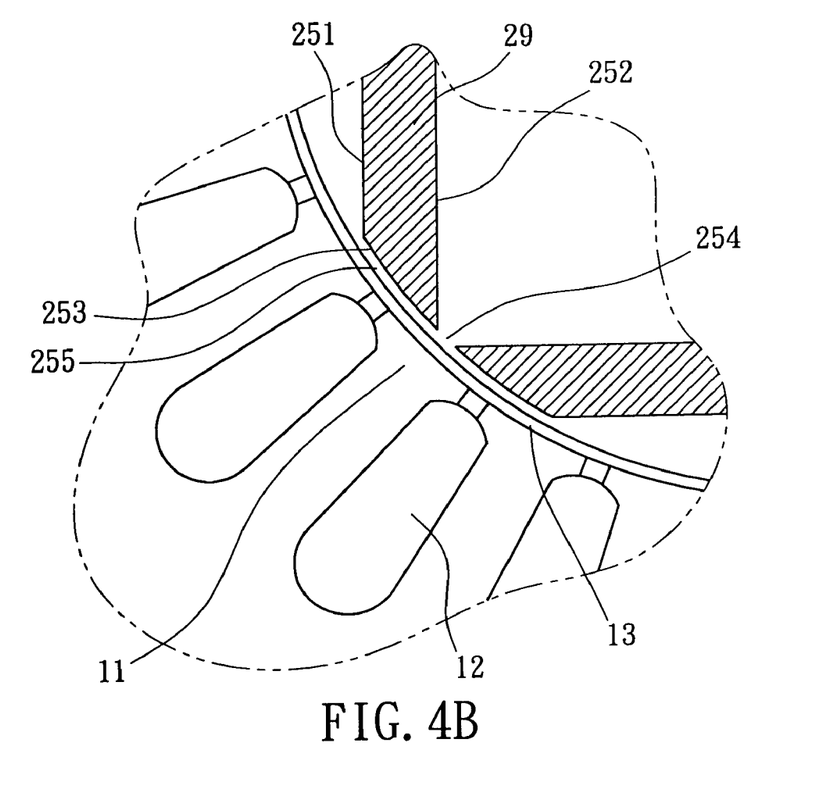
FIG. 4B is partial enlarged view of the first preferred embodiment A of motor of rotor with built-in permanent magnet for the present invention.

Please refer to FIGS. 4A and 4B, which are sectional structure and partial enlarged views of the preferred embodiments of motor of rotor with built-in permanent magnet. Wherein, the motor of rotor with built-in permanent magnet comprises of: an annular stator 1 and a rotor 2. The annular stator 1 is with a cylindrical capacity of a suitable diameter. The circumference surface of the cylindrical capacity is with teeth 11 and slots 12. Each tooth 11 and each slot 12 are interlaced each other. Slot 12 could be designed based on different needs, and because it is winded around with multi-phase coils. Different arrangements of permanent magnet 29 and opening 25 of different rotor 2 are mostly same and similar to the aforesaid rotor with permanent magnet. Therefore, persons knowing the technology well easily change the variable embodiments, and no further discussion is for the part. Following description focuses on different designs, thus same or similar elements are given same names and numbers.

The rotor 2 is a cylindrical structure, which is set in a cylindrical capacity, and there is a space 13 between the annular stator 1 and the rotor 2. When annular stator 1 is electrified, slot 12 produces magnetic forces in order for rotating rotor 2 in cylindrical capacity. In the preferred embodiment, rotor 2 includes the rotor core 20 and a plurality of permanent magnets 29. Rotor core 20 is a cylindrical structure, and the plurality of openings 25 are set surrounding a cylindrical structure, and the plurality of openings 25 are set surrounding a outer-skirt of the rotor core 20. The shape of permanent magnet 29 fits with opening 25, and the arrangement of the way of interlaced magnetic poles for permanent magnets 29 are contained in openings 25.

In the preferred embodiment, opening 25 is designed similar to a rectangular or trapezoid to fit with permanent magnet 29 of the same rectangular or trapezoid for easily inserting permanent magnet 29 into opening 25. The opening 25 is with two parallel surfaces, a top surface 251 and a bottom surface 252. The top surface 251 is formed on a side of the opening closest to an outer circumference of the rotor core and extends a length of the rotor core. The opening has a side surface 253 which is substantially parallel to the outer circumference of the rotor core 20. In this preferred embodiment, the side surface 253 is an arc surface, which curvature is equal to a circumference contour of the rotor core 20. Of course, a polygon arc surface approaching the curvature of the circumference contour could reach same function. A suitable space 255 is between side surface 253 and the outer circumference of the rotor core 20. The space 255 is small and plays the role of flux-barrier, but easily made, and it performs well when the distance smaller than 0.7 mm. Two adjacent side surfaces 253 are spaced by a channel 254 with suitable width. The width of the channel 254 is small and functions as a flux-barrier. In the preferred embodiment, channel 254 performs well when the width is smaller than 0.7 mm.

In the aforesaid preferred embodiment, two ends of side surface 253 separately connect to top surface 251 and bottom surface 252. For preventing permanent magnet 29 damaged in manufacturing, the adjacent parts of side surface 253 are trimmed to be arc-shaped; of course, a cross section of permanent magnet 29 matches a cross section of the opening so that the permanent magnets can be inserted into the opening.

Figure 1B:
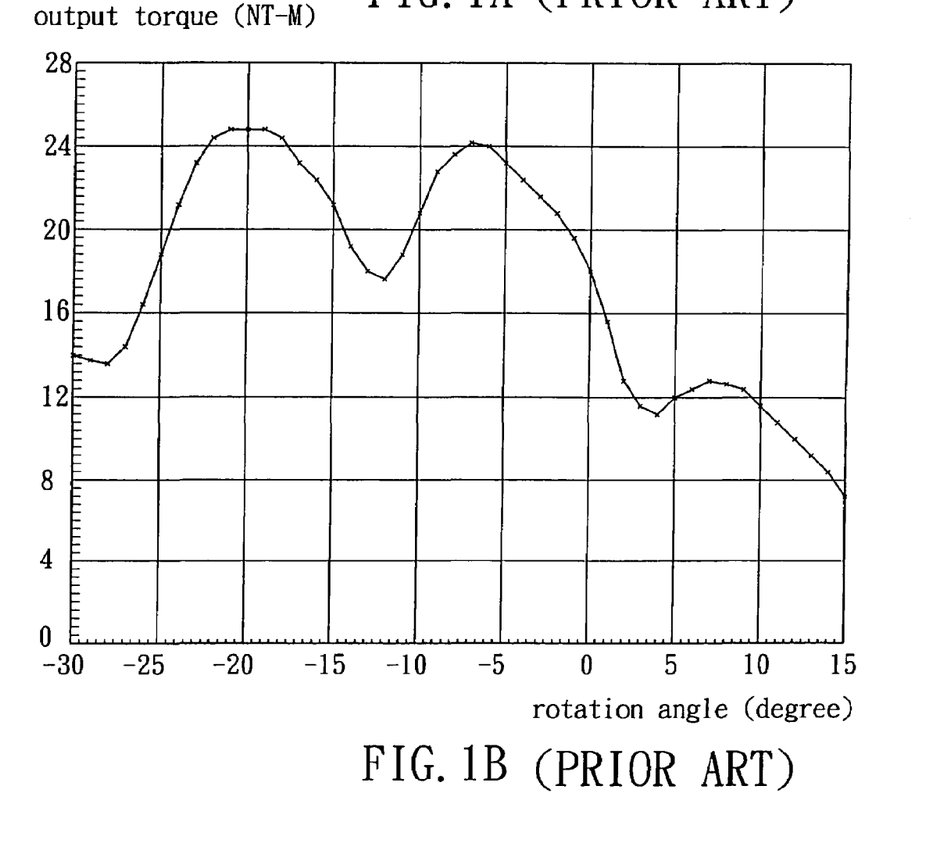
FIG. 1B is output torque diagram of motor of rectangular piece permanent magnet in prior art.
Figure 1C:
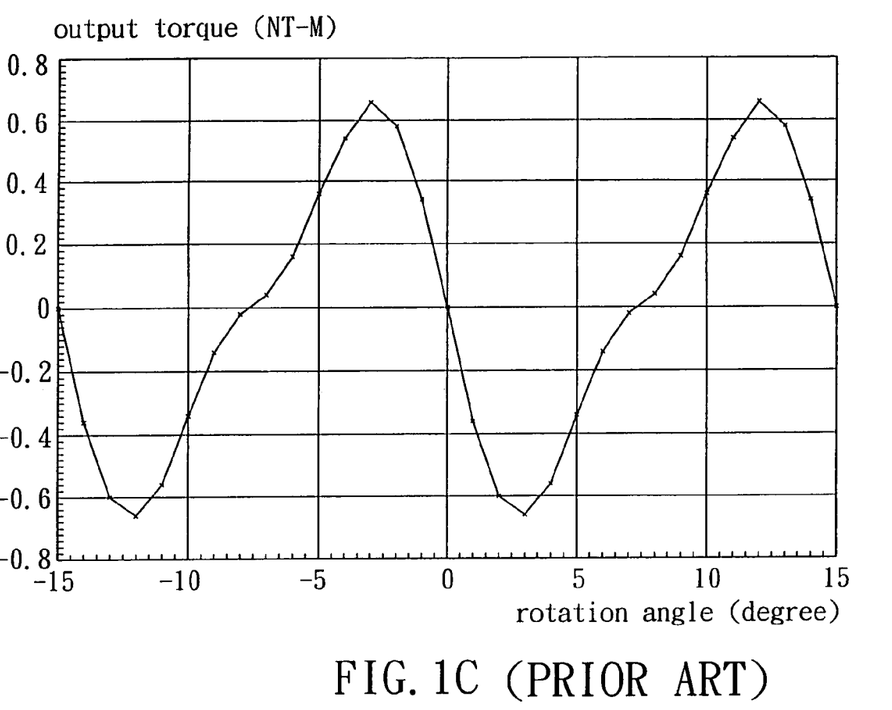
FIG. 1C is cogging torque diagram of motor of rectangular piece permanent magnet in prior art.
Figure 4C:
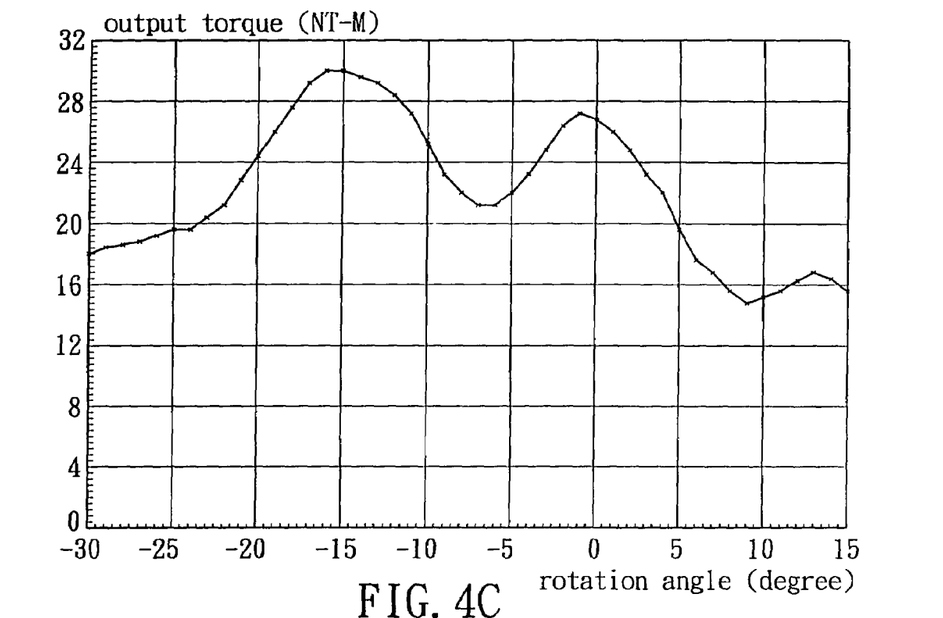
FIG. 4C is output torque diagram of the first preferred embodiment of motor of rotor with built-in permanent magnet for the present invention.
Figure 4D:
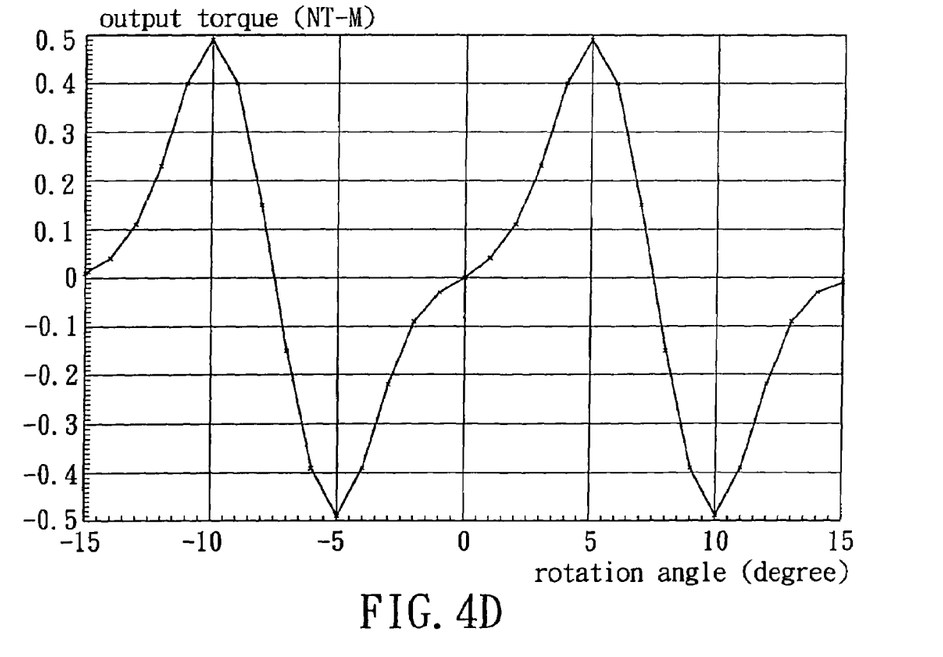
FIG. 4D is cogging torque diagram of the first preferred embodiment of motor of rotor with built-in permanent magnet for the present invention.

Please refer to FIGS. 4C and 4D, which are the output torque and cogging torque diagrams of motor of rotor with built-in permanent magnet of the present invention. Wherein, the output torque and cogging torque of the preferred embodiment of motor of rotor with built-in permanent magnet compares with the prior art's in the figures. Under the conditions of that the annular stator 1 and the rotor 2 in prior art which dimension of outer diameter is same as the preferred embodiment's of the present invention, and two thicknesses of permanent magnets of the prior art and the preferred embodiment for the present invention are same, thus the showing as in figures, the comparison of the embodiment and the prior art of FIG. 1B is that the maximum output torque of FIG. 1B is 25 NT-m and the maximum output torque of the present invention in FIG. 4C is 30 NT-m, thus the promotion rate is over 15%; the maximum cogging torque of FIG. 1C is 0.7 NT-m and the maximum cogging torque of FIG. 4D is 0.5 NT-m, thus the decreasing rate is over 25%.

Figure 5A:
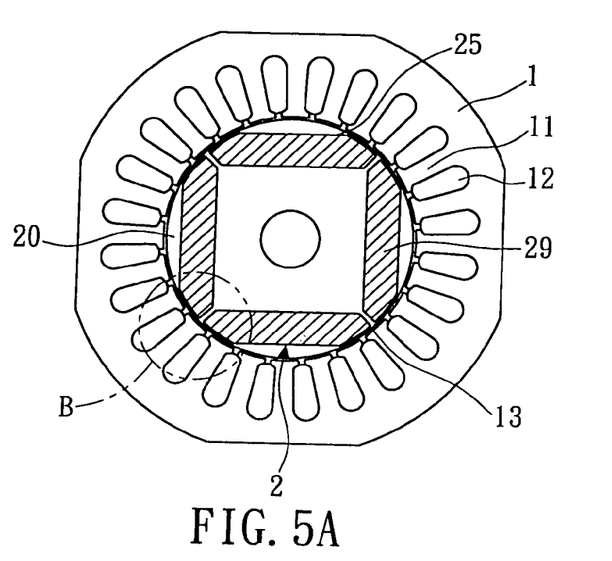
FIG. 5A is sectional structure view of the second preferred embodiment of motor of rotor with built-in permanent magnet for the present invention.
Figure 5B:
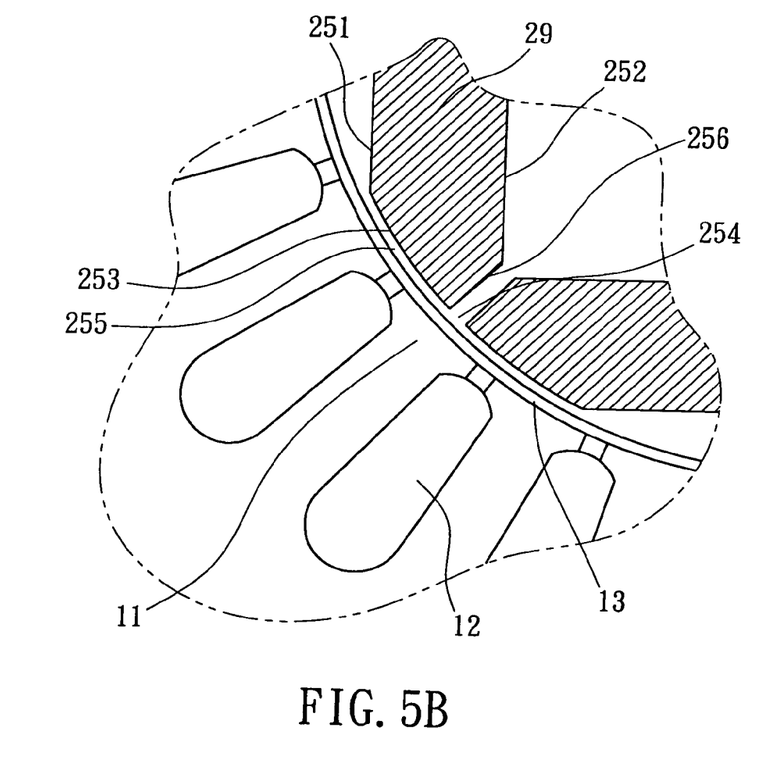
FIG. 5B is partial enlarged view of the second preferred embodiment B of motor of rotor with built-in permanent magnet for the present invention.
Figure 5C:
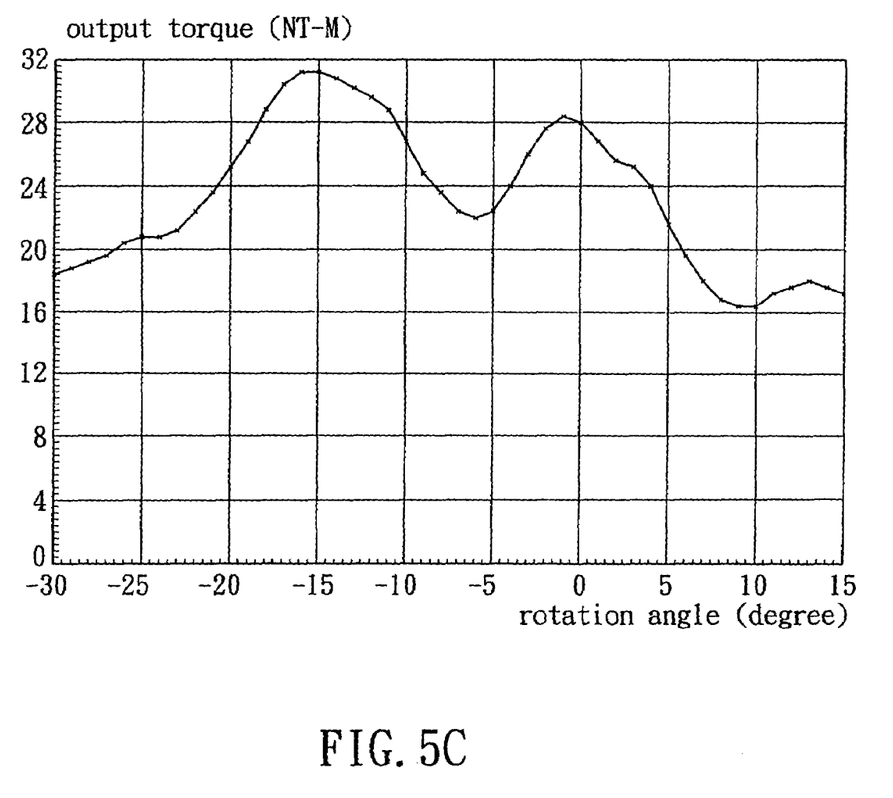
FIG. 5C is output torque diagram of the second preferred embodiment of motor of rotor with built-in permanent magnet for the present invention.

Please refer to FIG. 5A to 5C, which are another preferred embodiment of motor of rotor with built-in permanent magnet of the present invention. Wherein, the thickness of the permanent magnet 29 is changed, and an parallel channel side surface 256 is in between the side surface 253 and the bottom surface 252, thus side surface 253 and the parallel channel side surface 256 are taper arc surfaces, and a channel 254 between two adjacent permanent magnets 29 is strip shape. For preventing permanent magnet 29 damaged in manufacturing, the side surfaces 253 of opening 25 are arch-shaped; of course, the relative locations on permanent magnet 29 are arc-shaped as well. Wherein, the dimensions of outer diameters of annular stator 1 and the rotor 2 of the preferred embodiment is the same conditions as the preferred embodiment's for FIG. 4A to 4D, and the maximum output torque of the preferred embodiment is promoted to 31 NT-m, thus the promotion rate is about 5%.

Figure 6A:
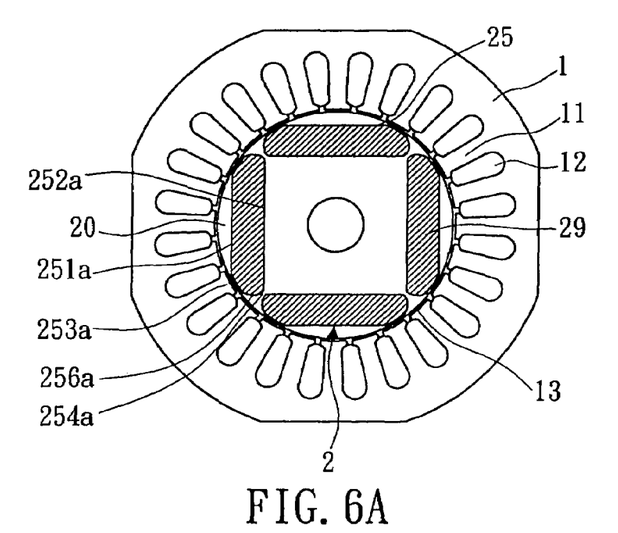
FIG. 6A is sectional structure view of the third preferred embodiment of motor of rotor with built-in permanent magnet for the present invention.
Figure 6B:
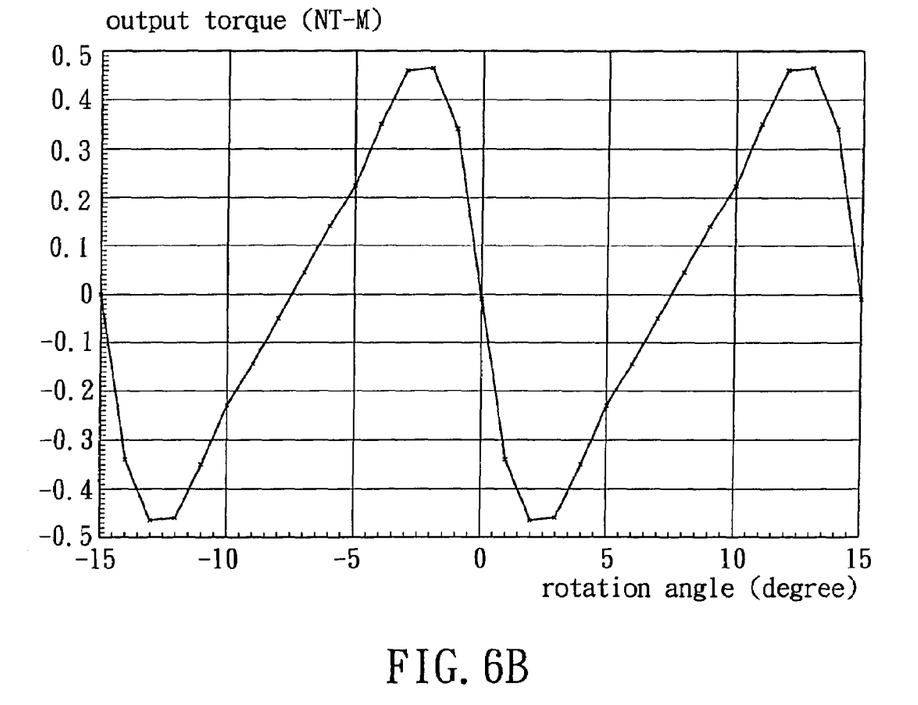
FIG. 6B is cogging torque diagram of the third preferred embodiment of motor of rotor with built-in permanent magnet for the present invention.

Please refer to FIGS. 6A and 6B, which are the third preferred embodiments of motor of rotor with built-in permanent magnet of the present invention. Wherein, a parallel channel side surface 256a is set between side surface 253a and bottom surface 252a. Parallel channel side surface 256a is modified to become a single arc surface or a multiple arc surface. The dimensions of outer diameters of annular stator 1 and rotor 2 are same as the embodiment's dimensions in FIG. 4A to 4D. The maximum cogging torque is lowered down to 0.46 NT-m, and the comparison to the embodiment in FIG. 4A to 4D is about 8% down. The above values are under the conditions of that both of the rotor length per meter and magnetic flux are identical, and then having them. Of course, changing some of the values is to adjust a little of result. Therefore, persons knowing the technology well easily change the variable embodiments, and no further discussion is for the part.

Figure 7:
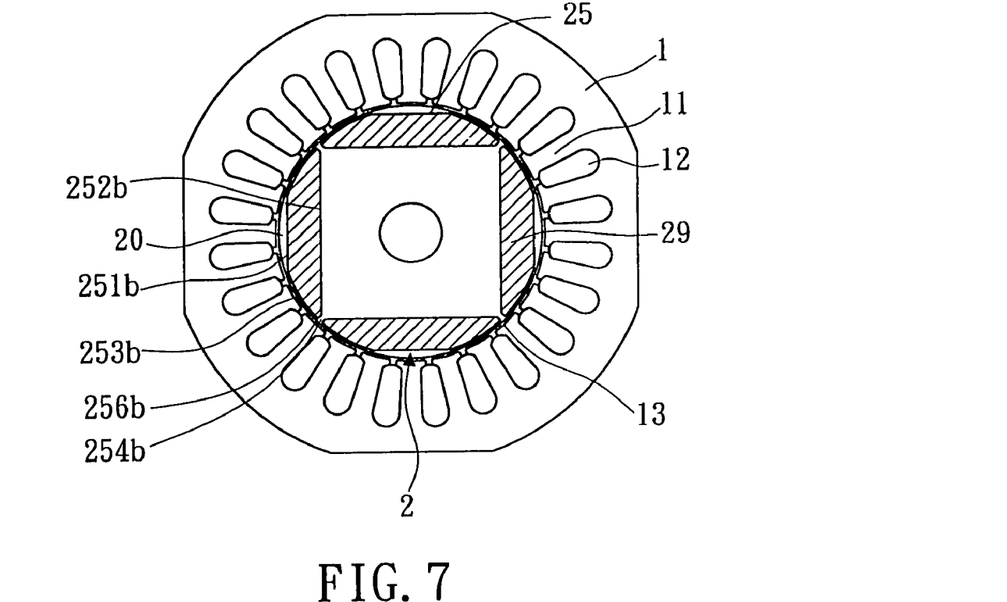
FIG. 7 is sectional structure view of the fourth preferred embodiment of motor of rotor with built-in permanent magnet for the present invention.
Figure 8:
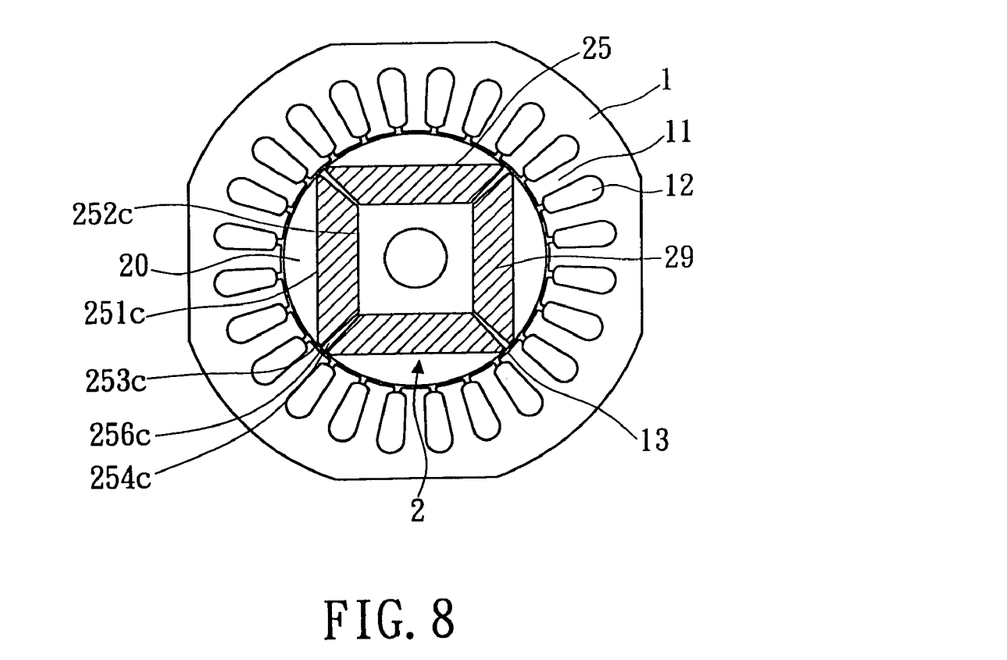
FIG. 8 is sectional structure view of the fifth preferred embodiment of motor of rotor with built-in permanent magnet for the present invention.
Figure 9A:
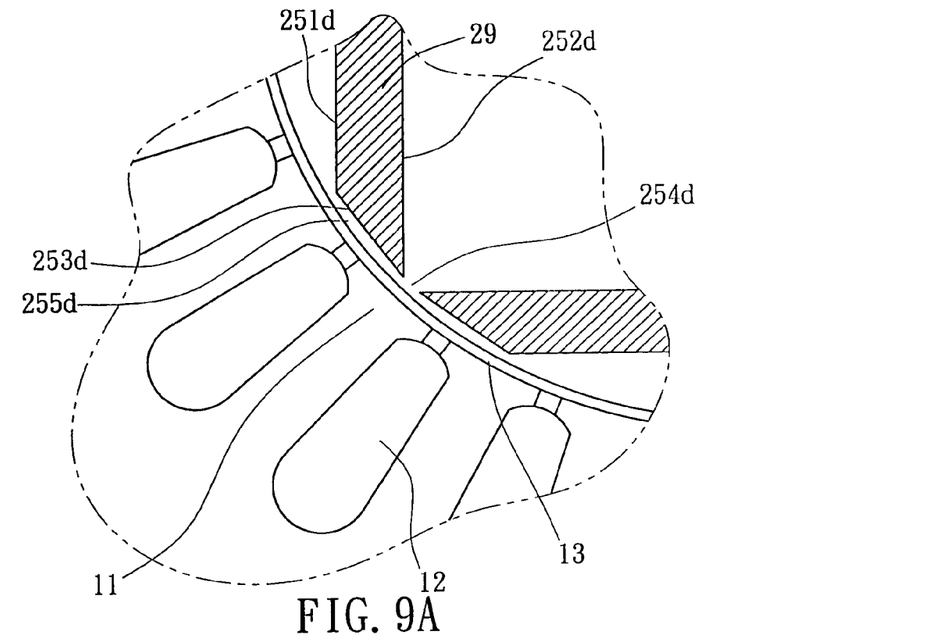
FIG. 9A is the sixth preferred embodiment of motor of rotor with built-in permanent magnet for the present invention.
Figure 9B:
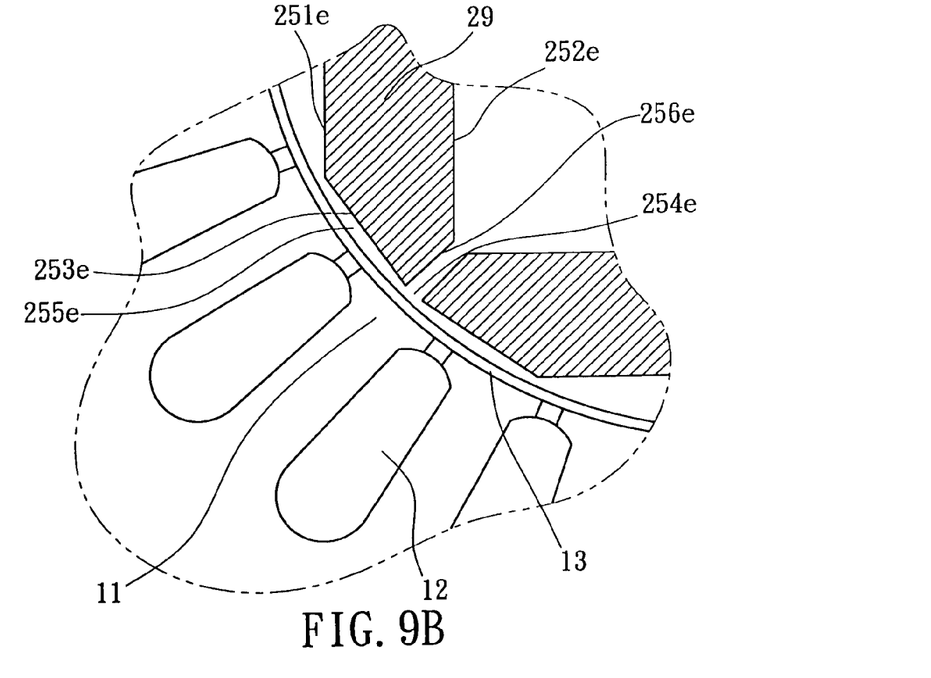
FIG. 9B is the sixth preferred embodiment of motor of rotor with built-in permanent magnet for the present invention.

Please refer to FIG. 7 to FIG. 9B, which are the fourth preferred embodiment of motor of rotor with built-in permanent magnet. The embodiment in FIG. 7 is that permanent magnet 29 is closer to contour of rotor core 20 and the thickness of permanent magnet 29 is greater, therefore, the side surface 253b is greater than the side surface 253 in FIG. 5A, and the channel 254b between two adjacent permanent magnets 29 is short strip structure. The embodiment in FIG. 8 is that permanent magnet 29 is closer to contour of rotor core 20, thus the parallel channel side surface 256c is smaller, and the section of channel 254c between outer contour of rotor core 20 and circle center is narrower. As showing in FIG. 9A, which is the amended one of FIG. 4b, another words, the side surface 253 in FIG. 4b is amended to the side surface 253d with straight line in FIG. 9A; same theory, the side surface 253 in FIG. 5b is amended to the side surface 253e with straight line in FIG. 9B. Therefore, persons knowing the technology well easily change the variable embodiments, and no further discussion is for the part.

Figure 10:
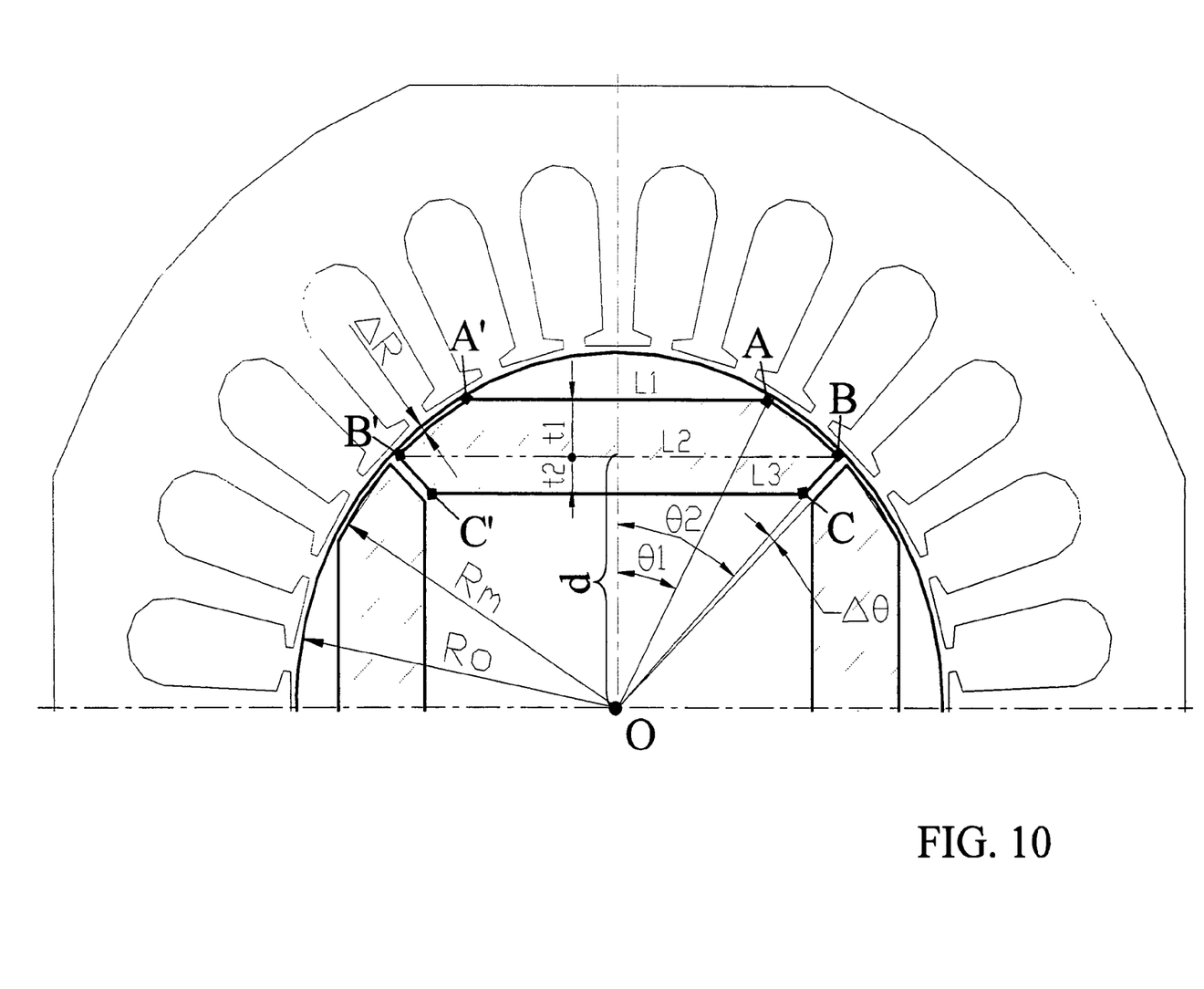
FIG. 10 is a cross-sectional enlarged view of the second preferred embodiment of motor of rotor with built-in permanent magnet for the present invention.

As shown in the FIG. 10, when the outer radius of the motor rotor Ro is determined, in order to meet the requirement of magnetic flux reduction, and due to the constrain of assembling, the minimum $\Delta R$ will be obtained. According to the practical experience in manufacturing, $\Delta R \leq 0.7$ mm will provide the optimal solution. Therefore the radius Rm of the maximum arc (shown as AB and A'B') of the magnet can be obtained, which means $\Delta R=(Ro-Rm)\leq 0.7$ mm.

Next, the thickness t has to be determined, according to the drawing, $t=t1+t2$, wherein t1 and t2 can be 0, so, the length of AA' (L1) is equal to $2(Rm*\sin\theta 1)$, which means $L1=2*(Rm*\sin\theta 1)$ and $L3=2*((Rm*\sin\theta 2)-(t2*\tan\theta 2))$, wherein $t1=Rm*(\cos\theta 1-\cos\theta 2)$ and $L3=CC'$.

From above, when $t1=0$, $\theta 1=\theta 2$, and $L1=L2(BB')$, the shape of magnet is shown as in FIG. 8. And when $t2=0$, $L3=L2(BB')$, the shape of magnet is shown as in FIGS. 4a and 7. When $t1\neq 0$, $t2\neq 0$, the shape of magnet is shown as in FIG. 5a.

From the drawing (FIG. 10), as seen, $d=Rm*\cos\theta 2$, $\theta 2$ is determined depending on the number of magnet gate of the motor and the requirement of the performance, when the number of magnet $P\geq 4$, $\theta 2=(360/P)-\Delta\theta$, wherein $\Delta\theta$ is the angle between the gap of two adjacent magnet toward the axis of the rotor, which means the gap is around $Rm*\Delta\theta$, in the experimental testing, the gap $\leq 0.7$ mm will produce the best performance, which also means $\Delta\theta\leq ((0.7/Rm)*(360/\pi))$. And when $P<4$, $\theta 2$ will not be limited, the value will be determined by the performance desired and the outer radius of the rotor of the motor.

As the aforesaid mention, the motor of rotor with built-in permanent magnet of the present invention is with the functions of flexible design and easy formation. The motor runs with low cogging torque and high output torque for promoting efficiency and decreasing vibration noise, and the cost is also low. Thus, the present invention totally figures out the shortcomings of prior art.

The above descriptions are the preferable embodiments of the present invention. The covered scopes of the present invention are not restricted on the embodiments shown in the present invention. All the changes according to the contents of the present invention, such as: the change of shapes or locations of the arrangement of the fastening structures, etc., the generated functions and characteristics similar to those of the embodiments of the present invention and any ideas thought by the persons well-known such technologies are all within the scopes of the present invention.

What is claimed is:

1. A motor having a rotor with built-in permanent magnets, the rotor comprising:
   a) a cylindrically shaped rotor core having:
   i) a central axial hole; and
   ii) a plurality of openings surrounding the central axial hole, each opening has at least four surfaces including a top flat surface and a bottom flat surface, the top flat surface is adjacent to the contour of rotor core and extends along the circumference of the contour to form two side surfaces respectively on two ends of the opening, and a distance is between the two side surfaces and the contour of rotor core;
   b) a plurality of permanent magnets, each of the plurality of permanent magnets having a cross-section that matches each of the plurality of openings, each magnet being inserted into one of the plurality of openings; and
   wherein the two side surfaces in each of the plurality of openings are each parallel with an outer contour of the cylindrically shaped rotor core, the distance is $\Delta R$ and $\Delta R=(R0-Rm)\leq 0.7$ mm, wherein $R0$ is the outer radius of the motor rotor and Rm is the distance from the center of the motor rotor to the side surface, each opening further includes two parallel channel side surfaces, and the permanent magnet for such kind of opening is in corresponding shape, wherein the angle formed by the two adjacent parallel channel side surfaces is $\Delta\Theta$, and $\Delta\Theta\leq [(0.7/Rm)*(360/\pi)]$(deg), and $\Theta_2$ is the angle defined by p and $\Delta\Theta$, p is the number of the permanent magnets, and when $p\geq 4, \Theta_2=[(360/p)-\Delta\Theta]]$ (deg), and $\Theta_1$ is the half angle formed by the line segment between two ends of the top flat surface and the center of the motor rotor, and the length of the top flat surface is $2[(Rm*\sin\Theta 1)]$, and the length of the bottom flat surface is $2[(Rm*\sin\Theta 2)]$.

2. The motor having the rotor with built-in permanent magnets according to claim 1, wherein the permanent magnets are positioned with interlaced magnetic poles.

3. The motor having the rotor with built-in permanent magnets according to claim 1, further comprising a stator having a plurality of teeth forming an cylindrical interior into which the rotor is inserted, the plurality of teeth being separated by a plurality of slots.

4. The motor having the rotor with built-in permanent magnets according to claim 1, wherein the cylindrically shaped rotor core is made of magnetic permeable material.

5. The motor having the rotor with built-in permanent magnets according to claim 1, wherein the cylindrically shaped rotor core includes a plurality of stacked silicon steel pieces to form the cylindrically shaped rotor core.

6. A motor having a rotor with built-in permanent magnets, the rotor comprising:
   a) a cylindrically shaped rotor core having:
   i) a central axial hole; and
   ii) a plurality of openings surrounding the central axial hole, each opening has at least six surfaces including a top flat surface and a bottom flat surface, the top flat surface is adjacent to the contour of rotor core and extends along the circumference of the contour to form two side surfaces respectively on two ends of the opening, and a distance is between the two side surfaces and the contour of rotor core, and a channel having a predetermined width is located between two parallel channel side surfaces;
   b) a plurality of permanent magnets, each of the plurality of permanent magnets having a cross-section that matches each of the plurality of openings, each magnet being inserted into one of the plurality of openings; and
   wherein the two side surfaces in each of the plurality of openings are each parallel with an outer contour of the cylindrically shaped rotor core, the distance is $\Delta R$ and $\Delta R=(R0-Rm)\leq 0.7$ mm, wherein $R0$ is the outer radius of the motor rotor and Rm is the distance from the center of the motor rotor to the side surface, the angle formed by the two adjacent parallel channel side surfaces is $\Delta\Theta$, and $\Delta\Theta\leq [(0.7/Rm)*(360/\pi)]$(deg), and $\Theta_2$ is the angle defined by p and $\Delta\Theta$, p is the number of the permanent magnets, and when $p\geq 4, \Theta=[(360/p)-\Delta\Theta]]$ (deg), and $\Theta_1$ is the half angle formed by the line segment between two ends of the top flat surface and the center of the motor rotor, and t is the total thickness of the permanent magnet and is dividable into thickness t1 and thickness t2, wherein $t=t1=t2$, and $t1=Rm(\cos\Theta_1-\cos\Theta_2)$, and the length of the top flat surface is $2[(Rm*\sin\Theta_1)]$, and the length of the bottom flat surface is $2[(Rm*\sin\Theta_2)-(t2*\tan\Theta_2)]$.

7. A motor having a rotor with built-in permanent magnets, the rotor comprising:
   a) a cylindrically shaped rotor core having:
   i) a central axial hole; and
   ii) a plurality of openings surrounding the central axial hole, each opening has at least four surfaces including a top flat surface and a bottom flat surface, the top flat surface is adjacent to the contour of rotor core and extends along the circumference of the contour to form two side surfaces respectively on two ends of the opening, and a distance is between the two side surfaces and the contour of rotor core; and a plurality of permanent magnets, each of the plurality of permanent magnets having a cross-section that matches each of the plurality of openings, each magnet being inserted into one of the plurality of openings; wherein the distance is $\Delta R$ and $\Delta R=(R0-Rm) \leq 0.7$ mm, wherein $R0$ is the outer radius of the motor rotor and $Rm$ is the distance from the center of the motor rotor to the side surface, wherein each opening further includes two parallel channel side surfaces, and the permanent magnet for each opening has a corresponding shape, wherein the angle formed by the two adjacent parallel channel side surfaces is $\Delta\Theta$, and $\Delta\Theta \leq [(0.7/Rm)*(360/\pi)]$(deg), and $\Theta_2$ is the angle defined by p and $\Delta\Theta$, p is the number of the permanent magnets, and when $p \geq 4$, $\Theta_2=(360/p)-\Delta\Theta]]$ (deg), and $\Theta_1$ is the half angle formed by the line segment between two ends of the top flat surface and the center of the motor rotor, and t is the total thickness of the permanent magnet and is dividable into thickness t1 and thickness t2, wherein $t=t1+t2$, and $t1=Rm(\cos\Theta_1-\cos\Theta_2)$, and the length of the top flat surface is $2[(Rm*\sin\Theta_1)]$, and the length of the bottom flat surface is $2[(Rm*\sin\Theta_2)-(t2*\tan\Theta_2)]$.

8. The motor having the rotor with built-in permanent magnets according to claim 7, wherein the two side surfaces in each of the plurality of openings are straight.

9. The motor having the rotor with built-in permanent magnets according to claim 7, wherein the two side surfaces in each of the plurality of openings each have a curved shape.

10. The motor having the rotor with built-in permanent magnets according to claim 7, wherein the permanent magnets are positioned with interlaced magnetic poles.

11. The motor having the rotor with built-in permanent magnets according to claim 7, further comprising a stator having a plurality of teeth forming an cylindrical interior into which the rotor is inserted, the plurality of teeth being separated by a plurality of slots.

12. The motor having the rotor with built-in permanent magnets according to claim 7, wherein the cylindrically shaped rotor core is made of magnetic permeable material.

13. The motor having the rotor with built-in permanent magnets according to claim 7, wherein the cylindrically shaped rotor core includes a plurality of stacked silicon steel pieces to form the cylindrically shaped rotor core.

* * * * *